May 3, 1932.　　　　L. BONSIEUR　　　　1,856,943
FISHING REEL
Filed March 5, 1928
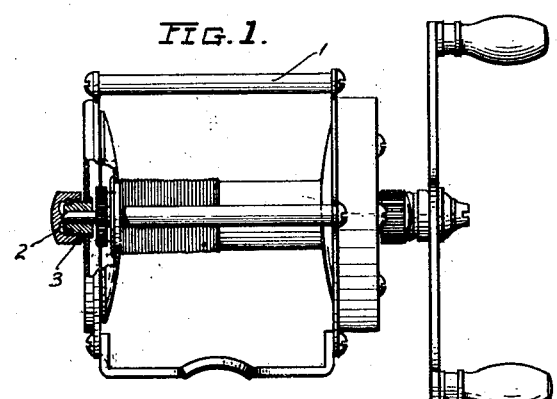
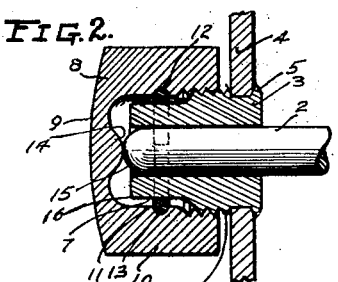
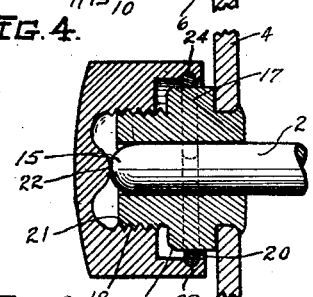
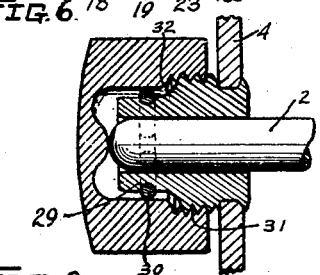
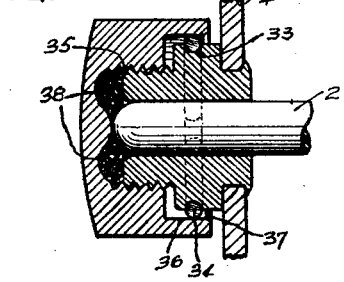
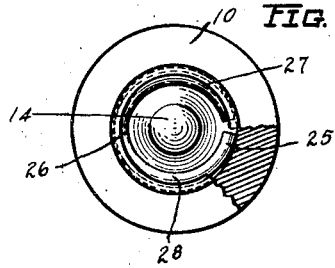
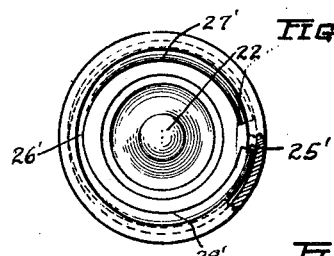
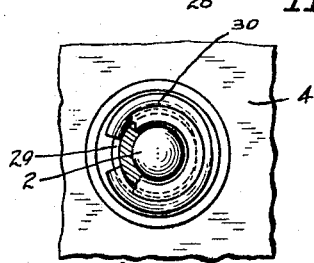
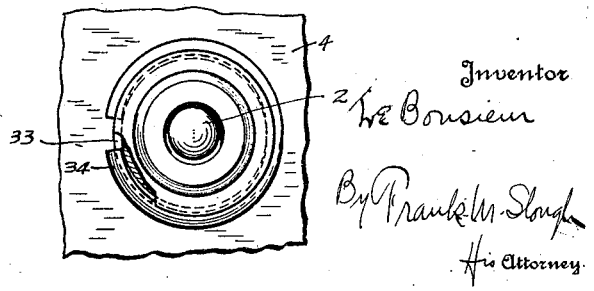
Inventor
L. Bonsieur
By Frank M. Slough
His Attorney Patented May 3, 1932

1,856,943

UNITED STATES PATENT OFFICE

LE BONSIEUR, OF ELYRIA, OHIO, ASSIGNOR TO THE GENERAL INDUSTRIES COMPANY, OF ELYRIA, OHIO, A CORPORATION OF OHIO

FISHING REEL

Application filed March 5, 1928. Serial No. 259,014.

My invention relates to improvements in fishing reels and more particularly it relates to an improved adjustable spool thrust bearing and frictional retainer therefor.

An object of my invention resides in the provision of an improved adjustable thrust bearing for the spool of a fishing reel, which may be adjusted to effectively retard rotation of the spool and to compensate for wear therein.

Another object of my invention is to provide an improved adjustable thrust bearing for fishing reel spools having provision for the reception of a lubricant for efficiently lubricating the bearing, and to provide a means of excluding foreign matter such as dirt or the like from the bearing.

Another object of my invention is to provide a bearing of the class referred to which is durable and simple in construction, readily adjustable, and which may be economically produced.

These and other objects of my invention and the invention itself will become apparent from reference to the following description of an embodiment thereof and in which description reference will be had to the annexed drawings forming a part of this specification.

Referring to the drawings:

Fig. 1 is an elevational view of a fishing reel embodying my invention, some of the parts comprising the same being shown in longitudinal section;

Fig. 2 is an enlarged longitudinal sectional view of the foregoing embodiment, a fragment of the reel structure being shown;

Fig. 3 is an end view into the interior of the cap per se of the foregoing embodiment, a portion thereof being broken away and shown in section;

Fig. 4 is an enlarged longitudinal sectional view of a second embodiment of my invention, a fragment of the reel structure being shown.

Fig. 5 is an end view into the interior of the cap of Fig. 4 removed from the fishing reel, a portion thereof being broken away and shown in section.

Fig. 6 is an enlarged longitudinal sectional view of another embodiment of my invention, a fragment of the reel structure being shown.

Fig. 7 is an elevational view of a portion of a fishing reel with the cap removed from the bearing boss, a portion of the bearing boss being broken away and shown in section, and Figs. 8 and 9 are views similar to those of Figs. 6 and 7 of another embodiment of my invention.

Referring to the various figures of the drawings wherein is illustrated several different embodiments of my invention, all employing somewhat similar means and all accomplishing substantially similar results, I show a fishline reel having apertured end plates connected by spacing pillars 1. A spool is disposed between the end plates secured to a spool shaft 2, which is journalled in a lateral bearing 3. The bearing 3 comprises an axially bored boss adapted to receive the spool shaft 2, and has a reduced end which may be inserted in an aperture in the end wall 4 and is upset at 5 to hold it securely therein. The bearing is provided with an enlarged threaded portion 6 adjacent the plate 4, the end being reduced at 7 to provide a smooth cylindrical surface. The end of the boss is rounded at 16.

At 8 is a bearing cap comprising a dome-shaped end 9 having a skirt 10 depending from its periphery. The inner portion of the skirt is reduced at 11 and the portion adjacent the edge of the skirt enlarged and threaded to engage the threaded portion of the bearing 6. In the reduced end of the cap is an annular groove 12 into which is inserted a substantially elliptical or oval split ring 13, preferably formed of small-gauge resilient steel wire, having its minor axis of normally smaller diameter than that of the end 7 of the bearing and having its major axis of greater diameter than the diameter of the annular groove 12. The tendency of the ring is to retain its normal unstressed contour which, by reason of its diameter being larger than the diameter of the groove, causes it to be retained within the groove. The end wall of the cap has a boss 14 extending therefrom and adapted to contact with the rounded end 15 of the shaft 2 serving as a thrust bearing therefor.

The embodiment of Figs. 4 and 5 is similar to that of Figs. 2 and 3 except that the bearing has the enlarged portion 17 adjacent the end plate 4 smooth and the free reduced end 18 threaded. The edge of the enlarged portion is slightly rounded at 19. The cap has the inner bore provided with an enlarged smooth portion 20 adjacent the edge of the skirt and a reduced threaded portion 21. The end is provided with a boss 22, similar to that of the preceding embodiment. The enlarged portion of the bore is provided with an annular groove 23 which carries therein a ring 24 of similar construction to that of the preceding embodiment but substantially larger.

A description of the operation of one of these embodiments will suffice to explain the operation of both. As best shown in Figs. 3 and 5, the portions of the resilient ring at 25 and 25' where it is split and diametrically opposite to the split at 26 and 26' are intersected by the major axis drawn through the ring which is substantially elliptical or oval. When the ring is placed within the groove these portions tend to engage the groove, and the portions 27, 28, 27' and 28' respectively, which are intersected by the minor axis of the ellipse, project inwardly away from the wall of the groove. When the cap is screw threaded upon the bearing, the end of the bearing being rounded at 16 and 19, easily enters the rings 24 and 12 and forces the portions 27, 28, 27' and 28' respectively outwards, by reason of the resiliency of the ring, into the groove. The cap is frictionally held against rotation by the portions intersected by the minor axis of the elliptical ring engaging the smooth portions of the bearing and those intersected by the major axis of the ring engaging the walls of the grooves.

The embodiment of Figs. 6 to 9 inclusive is in principle similar to that of the foregoing but has a few minor changes in construction. In Fig. 6 the reduced end of the bearing instead of being a smooth surface as in Fig. 2, is provided with a peripheral groove 29 into which is held, by its resiliency, a ring 30 similar in construction to that of the foregoing embodiment.

The portions of the bore of the cap adjacent the edge of the skirt are enlarged and threaded at 31 while the inner smaller bore is rounded at 32. The end wall is provided with the same type of thrust bearing as the preceding embodiment.

In Fig. 8 the enlarged portion of the bearing adjacent the end plate is provided with a peripheral groove 33 into which a ring 34 is placed, being similar to that of the foregoing embodiment, and is held therein by reason of its inherent resiliency. The free end of the bearing is reduced and threaded at 35. The cap is provided with an enlarged bore 36 adjacent the edge of the skirt, the edge being rounded at 37 and has the inner bore reduced and threaded.

The resilient rings in the last two embodiments are both of elliptical contour and engage the grooves in the bearings by those portions of the rings which are intersected by the minor axis and are held into the grooves by reason of their resiliency, the minor axis being smaller than the diameter of the bearing at the bottom of the groove. The points on the ring which are intersected by the major axis extend away from the bottom of the groove which tends to form a resilient spring on each side of the bearing.

When the cap is screwed upon the bearing the rounded edges of the plain surface, which in Fig. 6 is the edge of the small bore and in Fig. 8 is the edge of the large bore, permits the easy entrance for the bearing within the cap. Those portions of the rings which extend away from the bottom of the grooves engage the inner surface of the cap, which compresses the springs. The frictional engagement thus set up between the cap and the ring and between the ring and the bearing tends to prevent rotation of the cap and frictionally holds the same into any adjusted rotative position required to properly adjust the bearing.

I sometimes contemplate placing a small wick or other packing, which has thereon a lubricant, within the cap and surrounding the central boss as best shown at 38 in Fig. 8, which affords a reservoir and keeps the bearing supplied with oil.

Although in the embodiment of Fig. 1 I have shown two adjustable bearings, I do not desire to limit the scope of my invention to two as one will be effective.

Having thus described my invention in a plurality of embodiments, I am aware that numerous and extensive departures may be made from the embodiments herein illustrated and described but without departing from the spirit of my invention.

I claim:

1. In a fishing reel, the combination with a pair of spaced end plates, a spool shaft extending between the plates, journaled bearings carried by both said plates for the ends of said spool shaft, one of said bearings comprising a longitudinally bored bearing boss projecting from an outer surface of its supporting end plate, said bearing comprising an exteriorly threaded portion and a longitudinally spaced annular portion having a relatively smooth surface and a cap for said boss screw threaded onto the exterior threads thereof and a longitudinally spaced annular portion having an internal annular groove, a spring wire loop fitted within said groove and formed to expand outwardly to bring portions thereof having a relatively large diameter circular locus into frictional engagement with said groove, said wire loop being provided with other portions having a smaller internal circular locus adapted to engage the smooth annular surface of the boss to frictionally restrain rotative movements of the cap, said cap compising an axially disposed inner surface engageable with the end of the spool shaft forming a thrust bearing surface therefor.

2. A combination radial and end thrust bearing for a fishing reel spool shaft, comprising a bored boss supported by the reel having such shaft, said shaft projecting through said bore and a skirted cap element having a portion of its interior wall formed with screw threads adapted to cooperate with a similarly exteriorly screw threaded portion of the boss to effect adjustable telescoping axial movement of the cap on the boss, and friction means disposed between other opposing inner and outer surfaces of the cap and boss, respectively, comprising a spring wire loop formed to expand outwardly to bring portions thereof having a relatively large diameter circular locus into frictional engagement with the cap and being provided with other portions of smaller circular locus in frictional engagement with the boss for frictionally restraining the cap from rotative movement on the boss, said cap comprising an inner end wall surface engageable with the end of the shaft as a thrust bearing surface therefor.

3. A combination radial and end thrust bearing for a fishing reel spool shaft, comprising a bored boss supported by the reel having such shaft, said shaft projecting through said bore and a skirted cap element having a portion of its interior wall formed with screw threads adapted to cooperate with a similarly exteriorly screw threaded portion of the boss to effect adjustable telescoping axial movement of the cap on the boss, and friction means disposed between other oposing inner and outer surfaces of the cap and boss, respectively, comprising a spring wire loop formed to expand outwardly to bring portions thereof having a relatively large diameter circular locus into frictional engagement with the cap and being provided with other portions of smaller circular locus in frictional engagement with the boss for frictionally restraining the cap from rotative movement on the boss, said cap comprising an inner end wall surface engageable with the end of the shaft as a thrust bearing surface therefor, the end wall of said cap being annularly recessed in portions surrounding said thrust bearing surface.

4. A combination radial and end thrust bearing for a fishing reel spool shaft, comprising a bored boss supported by the reel having such shaft, said shaft projecting through said bore and a skirted cap element having a portion of its interior wall formed with screw threads adapted to cooperate with a similarly exteriorly screw threaded portion of the boss to effect adjustable telescoping axial movement of the cap on the boss, and friction means disposed between other opposing inner and outer surfaces of the cap and boss, respectively, comprising a spring wire loop formed to expand outwardly to bring portions thereof having a relatively large diameter circular locus into frictional engagement with the cap and being provided with other portions of smaller circular locus in frictional engagement with the boss for frictionally restraining the cap from rotative movement on the boss, said cap comprising an inner end wall surface engageable with the end of the shaft as a thrust bearing surface therefor, and a compressible lubricant absorbing packing disposed between opposite end wall surfaces of said cap and boss surrounding said thrust bearing surface.

5. In a fishing reel, the combination with a pair of spaced end plates, a spool shaft extending between the plates, journaled bearings carried by both said plates for the ends of said spool shaft, one of said bearings comprising a longitudinally bored bearing boss projecting from an outer surface of its supporting end plate, said bearing comprising an exteriorly threaded portion and a longitudinally spaced annular portion having a relatively smooth surface and a cap for said boss screw threaded onto the exterior threads thereof and a longitudinally spaced annular portion having an internal annular groove, a spring wire loop fitted within said groove and formed to expand outwardly to bring portions thereof having a relatively large diameter circular locus into frictional engagement with said groove, said wire loop being provided with other portions having a smaller internal circular locus adapted to engage the smooth annular surface of the boss to frictionally restrain rotative movements of the cap, said cap comprising an axially disposed inner surface engageable with the end of the spool shaft forming a thrust bearing surface therefor, the threaded portion of the boss being disposed relatively nearer to the end of the wall than the nonthreaded portion.

6. A combination radial and end thrust bearing for a fishing reel spool shaft, comprising a bored boss supported by the reel having such shaft, said shaft projecting through said bore and a skirted cap element having a portion of its interior wall formed with screw threads adapted to cooperate with a similarly exteriorly screw threaded portion of the boss to effect adjustable telescoping axial movement of the cap on the boss, and friction means disposed between other opposing inner and outer surfaces of the cap and boss, respectively, comprising a spring wire loop formed to expand outwardly to bring portions thereof having a relatively large diameter circular locus into frictional engagement with the cap and being provided with other portions of smaller circular locus in frictional engagement with the boss for frictionally restraining the cap from rotative movement on the boss, said cap comprising an inner end wall surface engageable with the end of the shaft as a thrust bearing surface therefor, the threaded portion of the boss being disposed relatively nearer to the end of the wall than the non-threaded portion.

7. In a bearing and cap for a fish line reel, in combination with a reel, said bearing comprising an axially bored boss having a threaded portion adjacent a smooth portion of the skirt, a groove in said smooth portion of the skirt, a resilient ring within said groove formed to have a normal elliptical shape, the portions at opposite ends of the major axis being adapted to frictionally engage the groove and portions at the opposite ends of the minor axis being adapted to embrace the smooth portion of the boss to retain the cap and the boss in a set position relative to each other.

8. A combination radial and end thrust bearing for a fishing reel spool shaft, comprising a bored boss supported by the reel having such shaft, said shaft projecting through said bore and a skirted cap element having a portion of its interior wall formed with screw threads adapted to cooperate with a similarly exteriorly screw threaded portion of the boss to effect adjustable telescoping axial movement of the cap on the boss, and friction means disposed between other opposing inner and outer surfaces of the cap and boss, respectively, comprising a spring of elliptical form adapted at the ends of its major axis to engage the inner surface of the cap and at its minor axis adapted to embrace and engage the outer surface of the boss for frictionally restraining the cap from rotative movement on the boss, said cap comprising also an inner end wall surface engageable with the end of the shaft as a thrust bearing surface therefor.

9. A combination radial and end thrust bearing for a fishing reel spool shaft, comprising a bored boss supported by the reel having such shaft, said shaft projecting through said bore and a skirted cap element having a portion of its interior wall formed with screw threads adapted to cooperate with a similarly exteriorly screw threaded portion of the boss to effect adjustable telescoping axial movement of the cap on the boss, and friction means disposed between other opposing inner and outer surfaces of the cap and boss, respectively, comprising an ellipse form spring wire loop frictionally resiliently engaging the inner surface of the cap and frictionally resiliently embracing the outer surface of the boss for restraining the cap from rotative movement on the boss, an annular groove associated with the cap and boss and engaging the loop to determine its axial position relative to the shaft, said cap comprising an inner end wall surface engageable with the end of the shaft as a thrust bearing surface therefor.

10. In a fishing reel, the combination with a pair of spaced end plates, a spool shaft extending between the plates, journaled bearings carried by both said plates for the ends of said spool shaft, one of said bearings comprising a longitudinally bored bearing boss projecting from an outer surface of its supporting end plate, said bearing comprising an exteriorly threaded portion and a longitudinally spaced annular portion having a relatively smooth surface and a cap for said boss screw threaded onto the exterior threads thereof and a longitudinally spaced annular portion having an internal annular groove, a spring wire loop of elliptical form adapted to fit in said groove at the ends of its major axis and adapted to embrace and frictionally engage the smooth annular surface of the boss at its minor axis to frictionally restrain rotative movement of the cap, said cap comprising an inner end wall surface engageable with the end of the shaft as a thrust bearing surface therefor.

In testimony whereof I hereunto affix my signature this 1st day of March, 1928.

LE BONSIEUR.